Dec. 16, 1952 L. G. HOGSTEN ET AL 2,621,920
VEHICLE SUSPENSION
Filed Feb. 7, 1949 4 Sheets-Sheet 1
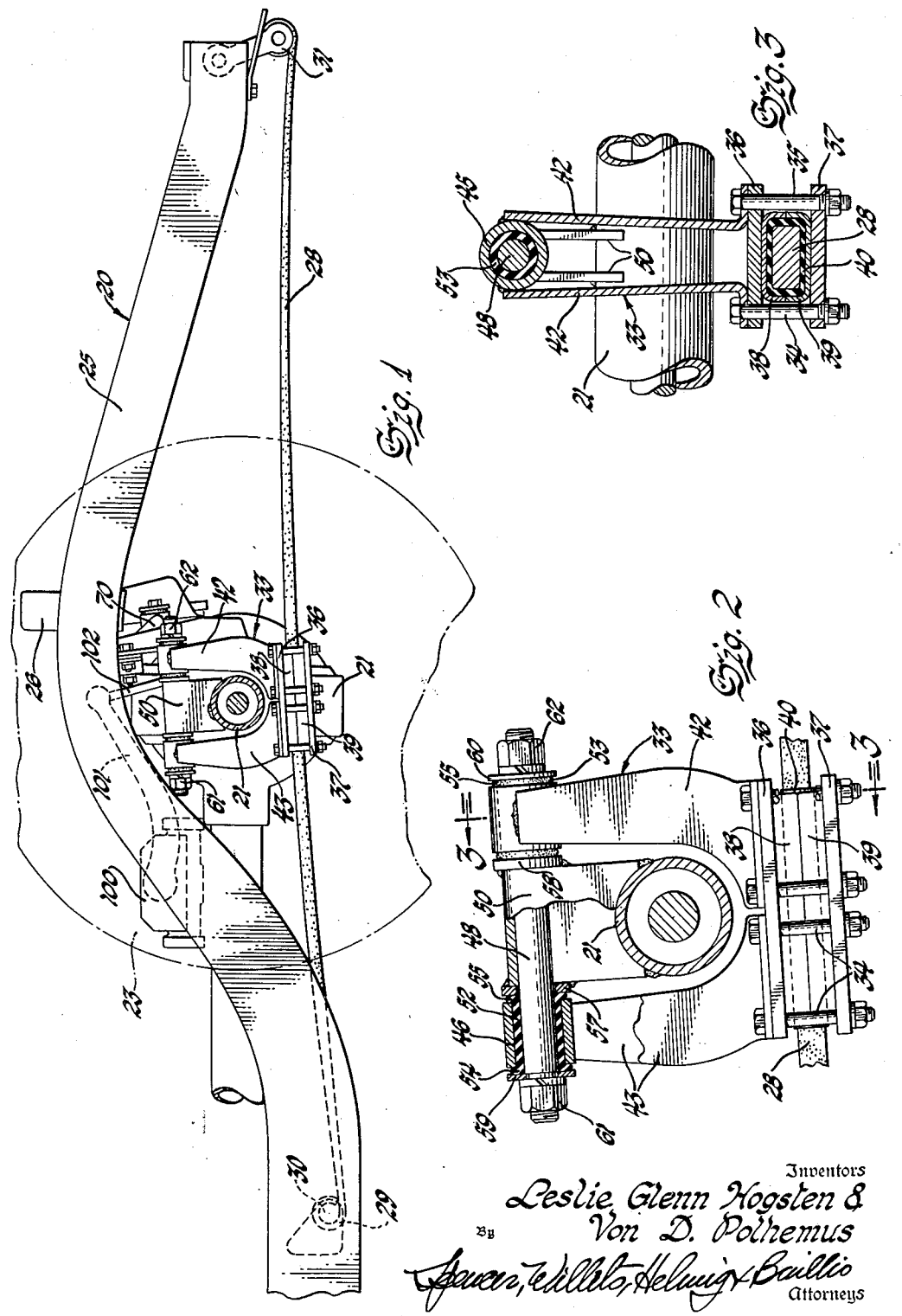
Inventors
Leslie Glenn Hogsten &
Von D. Polhemus
By
Sauer, Wilato, Helwig & Baillio
Attorneys

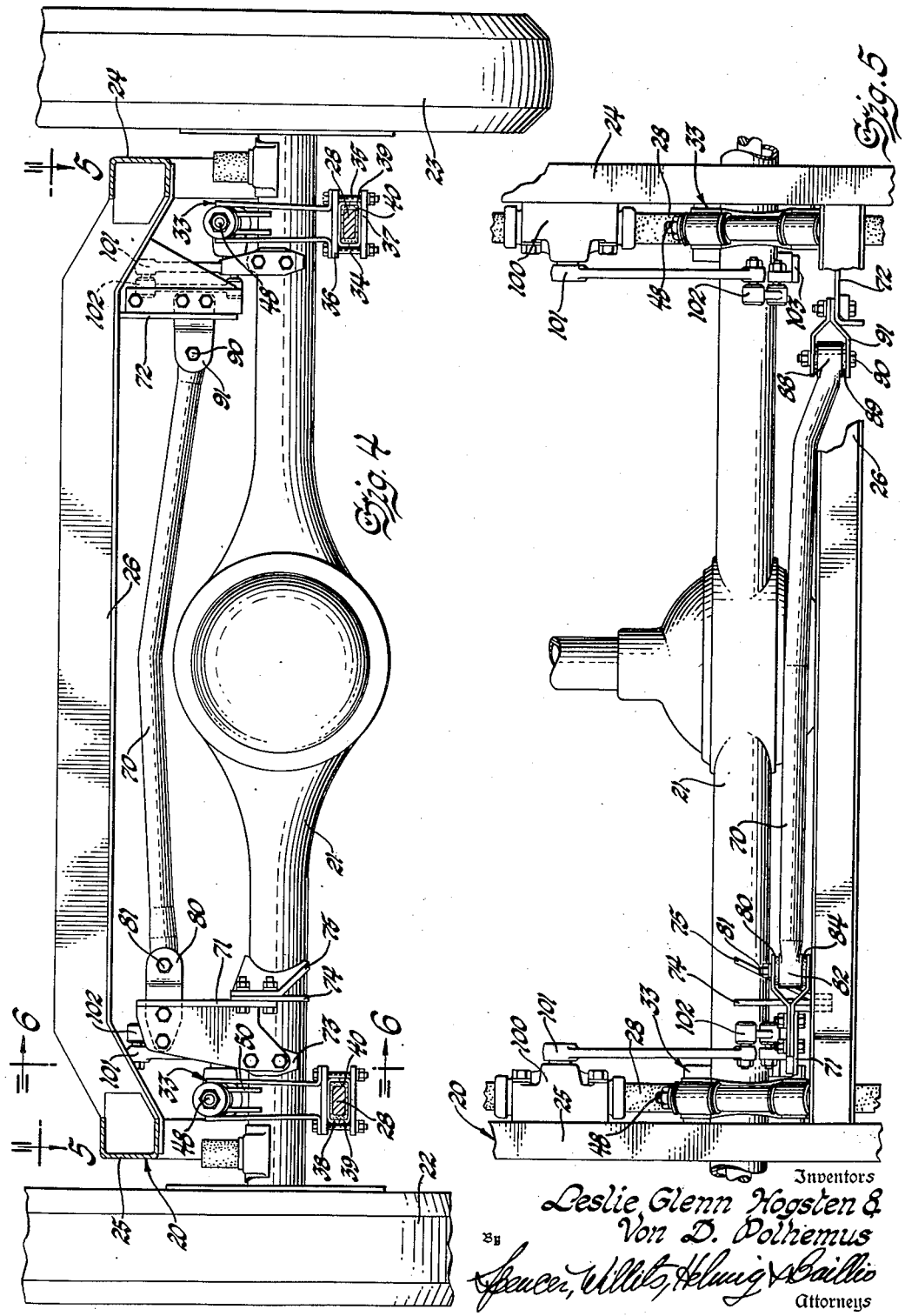

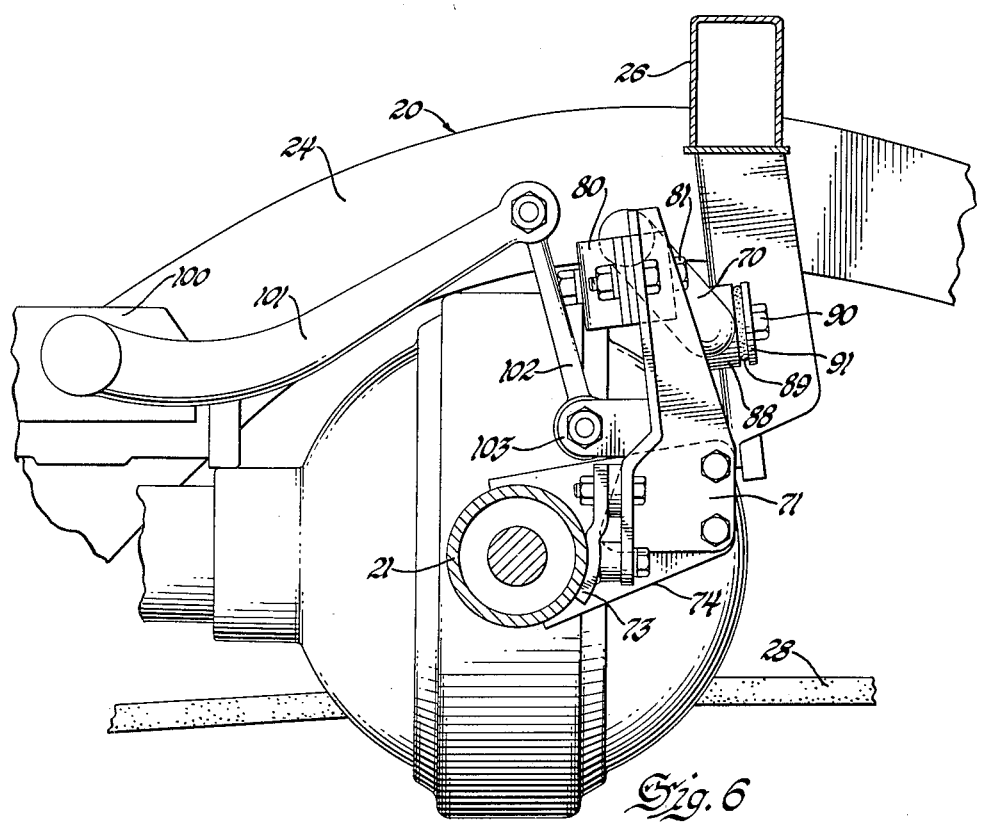
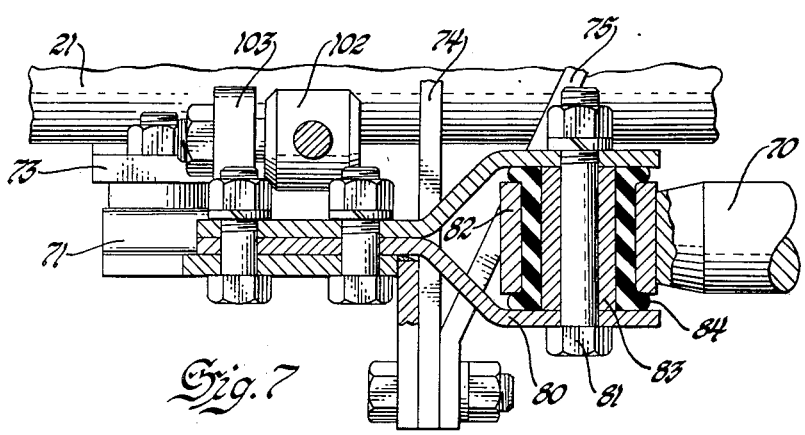

Patented Dec. 16, 1952

2,621,920

UNITED STATES PATENT OFFICE 2,621,920

VEHICLE SUSPENSION

Leslie Glenn Hogsten, Detroit, and Von D. Polhemus, Plymouth, Mich., assignors to General Motors Corporation, Detroit, Mich., a corporation of Delaware Application February 7, 1949, Serial No. 74,872

10 Claims. (Cl. 267—44)

1

This invention relates to vehicle spring suspensions and particularly to a high roll center, longitudinal leaf spring suspension for automotive vehicles.

As is well known, conventional applications of longitudinal leaf springs between the frame and axle of an automotive vehicle, in addition to their primary function of cushioning relative displacements of the frame and axle, provide both lateral and longitudinal stability between those members. In such suspensions, the springs preferably pass under the axle, both to facilitate obtaining a low vehicle center of gravity and to lessen the tendency toward wheel hop during acceleration and deceleration. With the springs fixedly anchored intermediate their ends to the axle housing and having an approximately flat (unbowed) configuration at normal vehicle loads for best spring rate characteristics, the lateral stiffness between frame and axle is effective substantially below the center of gravity of the axle. The height of this lateral stiffness relative to the axle center of gravity has considerable influence on the degree of side shake induced in the axle and wheels by wheel tramp. We have found that when the roll center (center of lateral stiffness between frame and axle) is raised to a selected height substantially (in the neighborhood of three to five inches) above the axle center of gravity, the side shake induced by wheel tramp is reduced to a low enough value that it produces no objectionable discomfort to the vehicle passengers, irrespective of vehicle speed or road condition.

Accordingly it is the general object of the invention to provide an automotive vehicle suspension incorporating longitudinal leaf springs passing under a dead axle in which the roll center is substantially above the axle.

Another object of the invention is to provide in a longitudinal leaf spring suspension for automotive vehicles, the combination of means for providing lateral freedom of movement between the vehicle frame and axle through the springs and means effective substantially above the axle to restrain said movement.

Still another object of the invention is to provide a longitudinal leaf spring suspension for an automotive vehicle, wherein the springs pass under and are laterally swingable relative to the axle about axes substantially above the axle, and substantially all lateral stiffness in the suspension is provided by a transverse link interconnecting the axle and frame at points substantially above the center of gravity of the axle.

2

Other objects of the invention relate to the structural features and arrangement of the elements making up a preferred embodiment of the invention as hereinafter described and illustrated in the drawings, in which:

Figure 1 is a left side elevational view of our suspension as applied to the rear end of an automotive vehicle chassis, certain parts being broken away and in section.

Figure 2 is an enlarged fragmentary view, similar to Figure 1, and showing details of the spring to axle housing connection.

Figure 3 is a fragmentary view taken on line 3—3 of Figure 2, with parts broken away and in section.

Figure 4 is an elevational view of the suspension as it appears looking longitudinally of the chassis, certain parts being broken away and in section.

Figure 5 is a plan view taken from line 5—5 of Figure 4.

Figure 6 is a further enlarged side elevational view taken from line 6—6 of Figure 4.

Figure 7 is an enlarged fragmentary view in plan showing details of the connection between the axle housing and the lateral stiffening means of the suspension.

Figure 8:
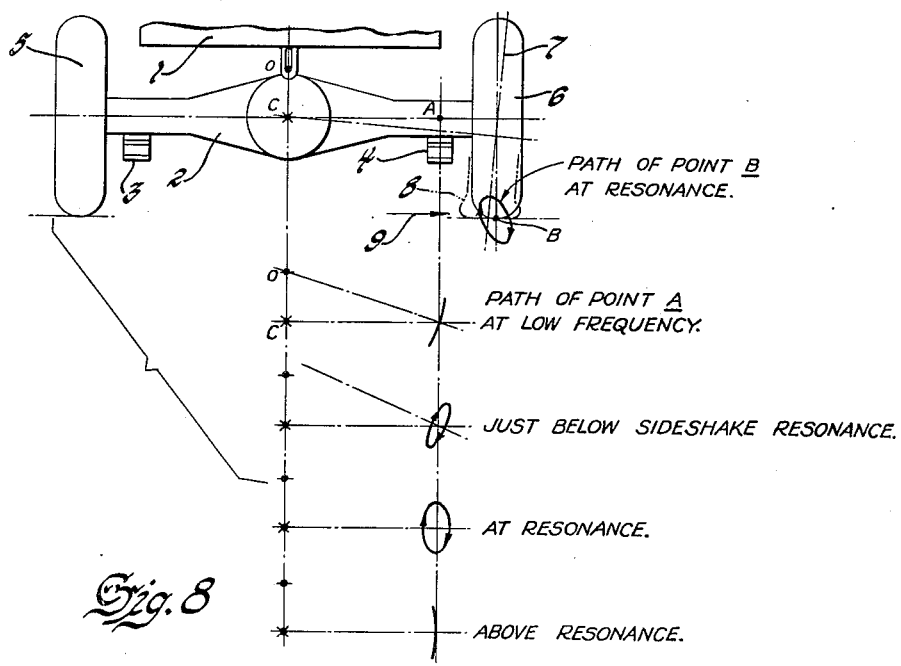
Figures 8 and 9 are diagrammatic illustrations of vehicle dead axle suspensions having roll centers located above and below the axle center of gravity, respectively, and the corresponding effect on side shake under wheel tramp conditions.
Figure 9:
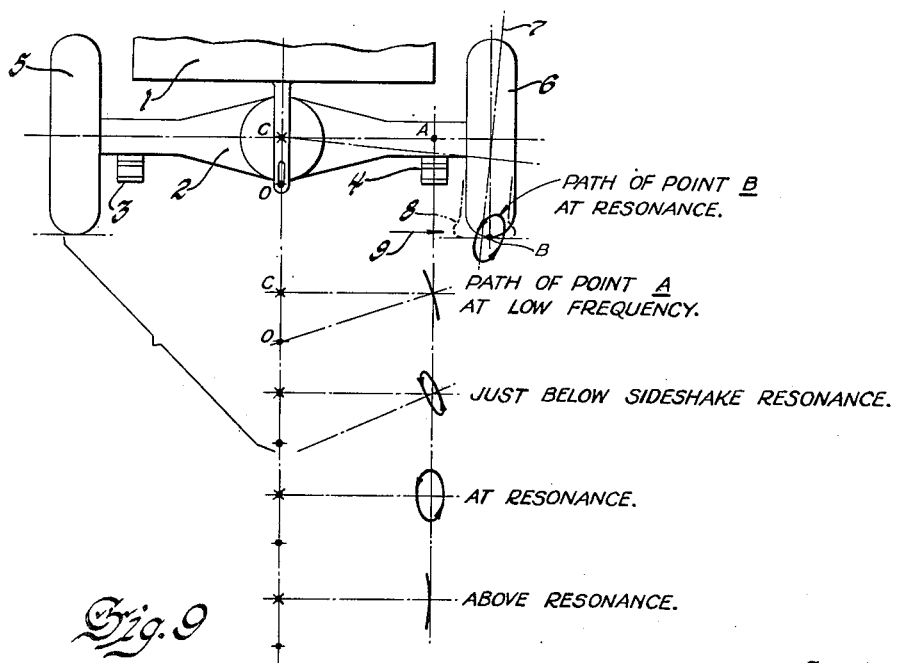

Before beginning a description of the structural features and arrangement of the elements making up a preferred embodiment of our suspension, reference is first made to Figures 8 and 9 which diagrammatically illustrate the effects of high and low roll centers on side shake resulting from wheel hop or tramp. In Figures 8 and 9 the vehicle body indicated at 1 is vertically suspended above a dead axle 2 through springs 3 and 4 connected in such a manner (not shown) to the axle and body that they effect no lateral stability between the axle and body. All such lateral stability is provided as shown schematically by the pin and slot connection through the point O. During travel of the vehicle over an uneven surface such as a bumpy or "washboard" road, the wheels 5 and 6 and axle 2 tramp or oscillate as a unit in a vertical plane relative to the body 1. At low frequencies this tramp occurs about the roll center O, located above the center of gravity C of the axle in Figure 8 and below the center of gravity C of the axle in Figure 9. In each case, a point on the axle such as A describes a circular arc about the roll center O, the effect of the inertia forces (due to the offset of the center of gravity C with respect to the roll center O) being sufficiently small that the lateral components of the motion of point A are in phase with the vertical components. With increasing frequency, the center of motion moves farther away from the center of gravity C and the lateral components or side shake lags more and more behind the tramp represented by the vertical components, with the result that at just below side shake resonance, the path of point A is somewhat elliptical in shape. In the case of the low roll center suspension shown in Figure 9, the direction of this elliptical motion is counterclockwise, whereas in the high roll center suspension of Figure 8 it is clockwise, as shown, the difference in direction in the two cases being due to the relative points of application of the inertia forces with respect to the center of motion. At side shake resonance, the path of point A opens up into an upright ellipse, and above resonance the side shake lags 180° behind the tramp and the center of motion moves very close to the center of gravity of the axle.

With each downward movement of the wheel 6 relative to wheel 5 the former reaches an outwardly cambered position as indicated by the broken line 7 in which position the tire 8 is subjected to a horizontal reaction force indicated by the arrow 9 from the road. During wheel tramp, a point B representing the point of contact between the tire and road also describes an ellipse similar in direction to that of point A. In the case of the low roll center suspension of Figure 9, the motion of point B and the force 9 are in the same relative direction, with the result that energy is picked up from the tires contacting the road to increase the side shake amplitude. Contrarywise in the case of the high roll suspension of Figure 8, the force 9 resulting from wheel camber is in the opposite direction to the motion of point B and serves to dampen the side shake.

Referring now to Figures 1 through 7 our novel suspension is shown in resilient support of a rear axle housing 21 which latter carries road wheels 22 and 23 in conventional manner. The frame 20 includes the usual longitudinal side rails 24 and 25 and a cross member 26 approximately opposite the axle housing 21. Extending longitudinally of the frame under the axle housing 21 at each side of the vehicle is a relatively flat, semi-elliptical, single leaf spring 28, the forward end 29 of which is pivotally connected to the frame 20, preferably through rubber covered pin 30 and the rearward end is connected through a rubber bushed shackle 31. Intermediate its ends each spring 28 is connected to the axle housing 21 through hanger members in the form of yokes 33 which are secured to the spring as by clamping means such as bolts 34 and 35 extending through upper and lower plates 36 and 37 which tightly bind the spring between upper and lower clamping housings 38 and 39. Between the housings 38 and 39 and the leaf spring 28, flexible cushioning means such as a layer of rubber or like material 40 is disposed. The yokes 33 have upwardly extending arms 42 and 43 loosely straddling the axle housing 21 and provided at their upper ends with aligned openings 45 and 46 on axes parallel with the longitudinal axis of the vehicle. Pivotally supporting the springs 28 through the arms of the yokes 33 are trunnion members 48 which journal in the openings 45 and 46. The trunnion members 48 are fixedly mounted on the axle housing 21 as by brackets 50. Rubber bushings 52 and 53 lining the arm openings 45 and 46 are outwardly flanged at each end as at 54 and 55. Their flanged ends 55 abut washer-like thrust plates 57 and 58 secured to the brackets 50, and their flanged ends 54 similarly abut washers 59 and 60 threadedly secured on the ends of the trunnion members 48 as by nuts 61 and 62. The rubber bushings 52 and 53 thereby provide a limited degree of radial and endwise cushioning between the yokes 33 and the axle housing 21.

It will be noted that the yokes 33 by reason of their being swingably connected at their upper ends to the axle housing have the effect of raising the roll center of the suspension from the level of the springs 28 to a point substantially above the axle.

The lateral stability between the frame 20 and and the axle housing 21 is effected by a transverse anti-sway link or strut 70 of substantial longitudinal rigidity. The ends of the strut 70 are swingably connected to the axle housing and frame 20 through upwardly and downwardly extending brackets 71 and 72, respectively. Bracket 71 is rigidly anchored to the axle housing adjacent one of the yokes 33 in any desired manner as as by bolting to mounting pads 73, 74 and 75 welded to the surface of the housing 21. Extending transversely toward the opposite side of the vehicle and rigidly secured to the bracket 71 is a clevis member 80 carrying a cross pin such as the bolt 81. An eyelet portion 82 formed on the adjacent end of the strut 70 is secured to the clevis 80 by the cross pin 81, the latter having a sleeve 83 insulated from the eyelet portion 82 by a rubber grommet 84. The opposite end of the strut 70 is connected to its bracket 72 in similar manner by an eyelet portion 88, rubber grommet 89, clevis pin 90 and clevis 91. The durometer of the rubber grommets 84 and 89 is made sufficiently high that practically all the lateral rigidity or stiffness between the axle 21 and frame 20 is concentrated through the strut 70. The height of the strut end connections relative to the axle housing 21 thereby serves to establish the roll center of the suspension. As shown, the trunnion members 48 supporting the springs 28 are somewhat below the strut end connections, but both are substantially above the axle and together serve to locate the height of the roll center, with the true position of the latter being somewhere between them in elevation, depending primarily on the stiffness of the strut-connecting grommets 84 and 89 and the resistance to wind-up of the springs 28.

Conventional shock absorbers 100 are shown mounted to the frame side rails 24, with operating levers 101 connected to the axle housing 21 through links 102 and brackets 103.

In operation, displacement of both wheels 22 and 23 vertically relative to the frame 20 is controlled by the springs 28 and shock absorbers 100 in conventional manner. On the occasion of one wheel such as 23 striking a bump in the road, the axle housing 21 swings upwardly with it about the point of contact with the road of wheel 22, the spring 28 adjacent the wheel 23 yielding in opposition to the greater mass of the vehicle body on the frame 20, and the pivotal connections between the brackets 71, 72 and the strut 70 accommodating such movement of the axle housing. The yokes 33 tend to swing counterclockwise (as viewed in Figure 4) about their trunnion members 48 and effect a wind-up of the springs 28, while the vehicle frame and body tends to remain laterally stable by reason of its larger mass. The swinging of the axle housing 21 in the direction referred to, however, exerts a leftward pull on the frame 20 through the strut 70 and effects a movement in that direction which compensates for the tendency of the yokes 33 to swing about their trunnion members 48.

By reason of the roll center of this suspension being located substantially above the center of gravity of the axle, the effect is obtained corresponding to that illustrated diagrammatically in Figure 8, the coupling of side shake to wheel tramp being dampened by the tire forces due to wheel camber accompanying tramp.

We claim:

1. In a vehicle suspension, a vehicle frame, an axle carrying road wheels thereunder, a leaf spring below the axle and connected forwardly and rearwardly thereof to the frame, a member clamped to the spring intermediate its connections to the frame and having a portion extending above the axle, a bracket fixedly secured to the axle and providing a pivotal support for said portion about an axis extending longitudinally of the vehicle, and a transverse link pivotally connected to the frame adjacent one side of the vehicle and pivotally connected to the axle adjacent the opposite side of the vehicle, said link connections being at points substantially above the center of gravity of the combined axle and road wheels.

2. In a vehicle having a frame and a pair of road wheels at opposite ends of an axle housing, a pair of semi-elliptical springs extending longitudinally of the vehicle under each end of the axle housing and connected at each of their ends to the frame, hangers swingably securing the intermediate sections of the springs to the upper side of the axle housing, and a transverse link pivotally connected at its opposite ends to the axle housing and frame, respectively, both said link connections being located substantially above the center of gravity of the combined axle and wheels.

3. In a vehicle having a frame and a pair of road wheels carried by an axle, side springs extending longitudinally of the vehicle and passing under the axle, said springs being connected to the frame forwardly and rearwardly of the axle, members secured to the springs intermediate their ends and having pivotal connections with the axle about axes extending longitudinally of the vehicle and elevated relative to the wheel axes, and a strut extending transversely of the vehicle and pivotally connected at spaced points thereof to the axle and frame about axes extending longitudinally of the vehicle and elevated relative to the wheel axes.

4. In a vehicle suspension, a vehicle frame, an axle, trunnions extending longitudinally of the vehicle and rigidly secured to the upper side of the axle, leaf springs swingably movable under the axle about said trunnions and connected to the frame, an upwardly extending bracket rigidly secured to the axle adjacent one side of the vehicle and a downwardly extending bracket rigidly secured to the frame adjacent the opposite side of the vehicle, and a strut extending substantially parallel with the axle and swingably connected at its respective ends to said brackets.

5. In a spring suspension between a vehicle frame and a dead axle thereunder, a single-leaf longitudinal spring under the axle at each side of the vehicle, rubber-bushed pivot connections between the front ends of the springs and the frame and rubber-bushed shackle connections between the rear ends of the springs and the frame, brackets fixed to the top of the axle opposite each of the springs, hangers suspending the intermediate sections of the springs from the brackets and permitting unrestrained lateral swinging of the springs relative to the axle, and a transverse link having pivot connections with the frame and axle respectively at opposite sides of the vehicle and at heights substantially above the center of gravity of the axle, said link providing substantially all the lateral stability of the frame relative to the axle.

6. In a suspension between a vehicle frame and an axle, longitudinal side springs controlling vertical displacement of the axle and frame, said springs passing under the axle and having connections therewith accommodating lateral movement of the springs relative to the axle, and a substantially rigid transverse link controlling the lateral displacement of the frame relative to the axle, said link having end connections with the frame and axle located substantially above the axle and accommodating the relative vertical displacement of the axle and frame under load.

7. In a suspension between a vehicle frame and an axle, a single-leaf longitudinal spring under the axle at each side of the frame, pivot and shackle connections to the frame at the front and rear ends of the springs respectively, yokes secured to the springs intermediate their ends with upwardly extending arms loosely straddling the axle, trunnions rigidly secured to the top of the axle and journaled through rubber bushings to the arms, and a transverse anti-sway link interconnecting the axle and frame at points substantially above the axle.

8. In a suspension between a vehicle frame and a supporting axle, a transverse link effecting substantially the sole lateral stability of the frame relative to the axle, said link having end pivotal connections with the frame and axle accommodating relative vertical displacement therebetween, said pivotal connections being located substantially above the center of gravity of the axle, longitudinal side springs controlling the relative vertical displacement of the axle and frame and being disposed intermediate their ends below the axle, trunnions extending longitudinally of the frame and fixedly secured on top of the axle opposite the springs, hangers swingable on said trunnions and extending below the axle, means securing said hangers to the springs, and cushioning means insulating said last named means from the springs.

9. In a suspension between a vehicle frame and an axle, longitudinal side springs controlling vertical displacement of the axle and frame, said springs having connections with the axle accommodating lateral movement of the springs relative to the axle, and a substantially rigid transverse link controlling the lateral displacement of the frame relative to the axle, said link having end connections with the frame and axle located substantially above the axle and accommodating the relative vertical displacement of the axle and frame underload.

10. In a vehicle having a frame and a transverse axle thereunder carrying a road wheel adjacent each side of the vehicle, a single-leaf spring extending longitudinally of the vehicle and under the axle adjacent each wheel and connected forwardly and rearwardly of the axle to the frame, yoke members connecting the respective springs to the axle, said yoke members having axle straddling arms extending upwardly from a base portion clamped to the spring with the arms pivoted to the axle about axes extending longitudinally of the vehicle and substantially above the wheel centers, and a transverse link pivotally connected to the frame adjacent one wheel and pivotally connected to the axle adjacent the other wheel, said link pivotal connections being on axes substantially above the axle and extending longitudinally of the vehicle.

LESLIE GLENN HOGSTEN.
    VON D. POLHEMUS.

REFERENCES CITED

The following references are of record in the file of this patent:

UNITED STATES PATENTS

| Number | Name | Date |
|---|---|---|
| 123,937 | Saladee | Feb. 20, 1872 |
| 1,899,624 | MacPherson | Feb. 28, 1933 |
| 1,899,913 | McCuen | Feb. 28, 1933 |
| 2,159,859 | Nickelsen | May 23, 1939 |
| 2,179,016 | Leighton | Nov. 7, 1939 |
| 2,213,690 | Caldwell | Sept. 3, 1940 |
| 2,237,056 | Manning | Apr. 1, 1941 |
| 2,274,518 | Baker | Feb. 24, 1942 |
| 2,309,812 | Utz | Feb. 2, 1943 |